United States Patent [19]

Yamada et al.

[11] Patent Number: 4,734,805

[45] Date of Patent: Mar. 29, 1988

[54] MAGNETIC HEAD SUPPORTING MECHANISM

[75] Inventors: Tadaharu Yamada; Makoto Watanabe, both of Tokyo, Japan

[73] Assignee: NEC Corporation, Tokyo, Japan

[21] Appl. No.: 700,202

[22] Filed: Feb. 11, 1985

[30] Foreign Application Priority Data

Feb. 9, 1984 [JP] Japan .................................. 59-22256

[51] Int. Cl.[4] ........................... G11B 5/48; G11B 5/55; G11B 5/596
[52] U.S. Cl. ..................................... 360/104; 360/106; 360/128
[58] Field of Search ............... 360/103, 104, 106, 128, 360/130

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/104 X |
| 4,216,505 | 8/1980 | Grant et al. | 360/104 |
| 4,389,688 | 6/1983 | Higashiyama | 360/104 |
| 4,399,476 | 8/1983 | King | 360/104 |

FOREIGN PATENT DOCUMENTS

| | | | |
|---|---|---|---|
| 55-28538 | 2/1980 | Japan | 360/104 |
| 56-117367 | 9/1981 | Japan | 360/104 |
| 56-117325 | 9/1981 | Japan | 360/104 |
| 59-201272 | 11/1984 | Japan | 360/104 |

OTHER PUBLICATIONS

IBM-TDB by Norwood-vol. 21, No. 8, Jan. 1979, p. 3093, "Damped Head Arm".
IBM-TDB-by Rynders et al-vol. 11, No. 3, Aug. 1968, p. 248, "Damped Slider Mount".

*Primary Examiner*—Stuart N. Hecker
*Assistant Examiner*—Alyssa H. Bowler
*Attorney, Agent, or Firm*—Sughrue, Mion, Zinn, Macpeak, and Seas

[57] ABSTRACT

A magnetic head supporting mechanism for positioning a magnetic head at a target track on the surface of a magnetic disk includes an arm section for moving the magnetic head to radially access different data tracks of the disk. A suspension element includes a mount section securing the suspension element to the arm section and a resilient section integral with the mount section and a rigid load beam section integral with that resilient section. A magnetic head slider assembly is supported at the free end of the load beam section opposing the surface of the magnetic disk. A flexible resin mass is firmly attached to the surface of the resilient section with the surface of the flexible resin being free except for that portion which effects attachment of the flexible resin to the suspension element. The resin may be one from the group consisting of two-pack epoxy adhesive, a one-pack thermosetting adhesive and an ultraviolet curing adhesive. Preferably the elongation of the flexible resin is between 50 and 70 percent, and the flexible resin is preferably of convex shape with the convex resin of a height of about 0.3 mm.

10 Claims, 8 Drawing Figures

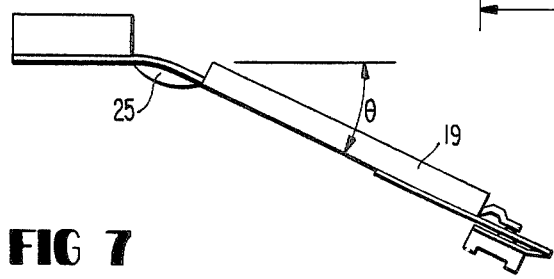
FIG 7
FIG 8
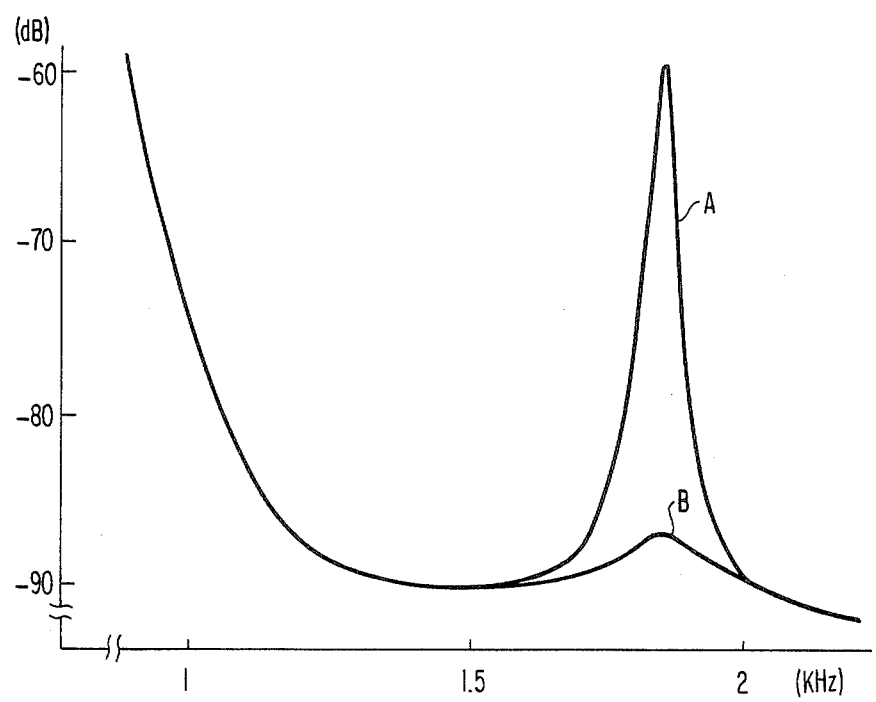

MAGNETIC HEAD SUPPORTING MECHANISM

BACKGROUND OF THE INVENTION

The present invention relates to a mechanism for supporting a magnetic head which records and reproduces data to a magnetic disk. More particularly, this invention relates to a structure of a suspension element for supporting a head slider.

The magnetic head slider has a transducing gap and a magnetic circuit and moves to radially accessing different data tracks on the surface of a rotating magnetic disk at high speed for recording data on the disk or reproducing the recorded data. It is necessary for the head slider to follow the changing topography (surface irregularities) of the rotating disk with keeping a constant floating space to the disk surface, as well as to be positioned at a target track on the surface of the disk at high speed and with high accuracy. For these reasons, the mechanism for supporting the head slider is required to press the head slider against the surface of the disk with an appropriate loading force. Further, the supporting mechanism is required to be flexible in the direction orthogonal to the disk surface, but rigid in the direction parallel to the disk surface.

In addition, there are many factors emitting a vibration in a magnetic disk driving apparatus. For example, a driving mechanism for rotating the magnetic disk, and an actuator assembly for moving the head slider in the radial direction of the disk emit vibrations. Further, the head supporting mechanism receives variant pressing force from the head slider floating on the disk in response to the changing topography of the disk surface. Therefore, the variance of the pressing force to the head supporting mechanism may causes the vibration in a resonant frequency. Accordingly, the head supporting mechanism is required not to give detrimental vibrations to the head slider.

This type of magnetic head supporting mechanism is disclosed in the U.S. Pat. Nos. 3,931,641 and 4,167,765. In these magnetic head supporting mechanism, the head slider is mounted on a flexure including a center tongue and two outer fingers. The flexure is secured to the appex of a suspension element including a triangular load beam section. The load beam section is provided with flanges to form a rigid beam structure. The suspension element is secured to a rigid arm section at its base portion. This head supporting mechanism resiliently supports the head slider closely to the disk surface such that the suspension element is substantially parallel to the disk surface.

Such a conventional magnetic head supporting mechanism permits the head slider to follow the changing topography of the disk. Further, this supporting mechanism presses the head slider with a proper pressure in a direction orthogonal to the disk surface. However, in recording or reproducing operation, the suspension element vibrates in both its longitudinal axial direction and the direction which is orthogonal to the longitudinal axis and parallel to the disk surface due to the aforementioned vibrations. This vibration is directly transmitted to the head slider through the beam structure. In consequence, the head slider also vibrates in directions parallel to the disk surface during the recording and reproducing operation. Namely, the head slider vibrates over a target track and the recording or reproduced signal degrades in quality. Therefore, sufficient width of the track pitch is required to cover the amplitude of the vibration of the slider. Thus, the vibration of the suspension element has been one of the reasors of preventing the increase in the track density of the disk.

SUMMARY OF THE INVENTION

Accordingly, an object of the present invention is to damp the vibration of the suspension element of the magnetic head supporting mechanism.

Another object of the present invention is to provide a magnetic head supporting mechanism which can position the magnetic head at a target track with high accuracy.

The inventors of the present invention have found that a phenomenon such that the head slider vibrates in the directions parallel to the disk surface is attributable to the minute irregularities existing on the surface of a resilent section of the suspension element in the vicinity of the mount portion of the suspension element to the arm section.

According to the present invention, there is provided a magnetic head supporting mechanism in which a flexible resin is firmly attached to the resilent section of the suspension element.

BRIEF DESCRIPTION OF THE DRAWINGS

The above-mentioned and other objects, features and advantages of the present invention will be better understood from the following detailed description of a preferred embodiment taken in conjunction with the accompanying drawings, wherein:

FIG. 7 is a side view of the magnetic head supporting mechanism shown in FIG. 1 in a free state; and FIG. 8 illustrates respective vibrational characteristics of a conventional magnetic head supporting mechanism and the magnetic head supporting mechanism according to the present invention.

DESCRIPTION OF THE PREFERRED EMBODIMENT

Figure 1:
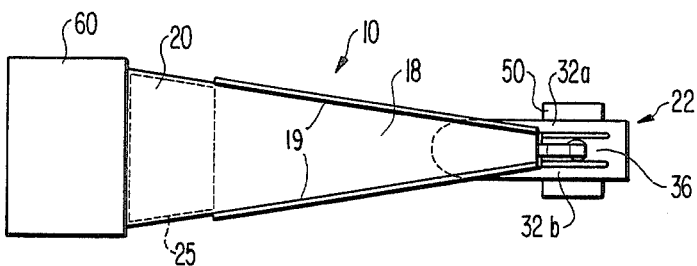
FIG. 1 is a plan view of a magnetic head supporting mechanism in accordance with one embodiment of the present invention.

Referring to FIGS. 1 to 6, a suspension element 10 made of stainless steel is attached by welding to an rigid arm section 60. The arm section 60 is mounted on an actuator assembly (not shown). The suspension element 10 includes a mount section 15 at which the suspension element 10 is attached to the arm section 60, a rectangular resilent section 20 and a trianglar load beam section 18. The triangular load beam section 18 is provided with flanges 19 formed by bending both sides of the triangular section 18. Due to the flanges 19, the rigidity of the triangular section 18 is increased, and functions as a load beam. A load beam offset 28 is integrally formed at the apex of the triangular section 18.

A flexure 22 is secured to the apex of the triangular section 18 by welding. The flexure 22 made of stainless steel is generally known as a gimbals spring. The flexure 22 includes two flexible outer fingers 32a and 32b having a narrow width and a center tongue 36 between the outer fingers 32a and 32b to which a head slider 50 is mounted. The outer fingers 32a and 32b and the center tongue 36 are connected together at one end of the flexure 22 opposite to the secured end to the triangular section 18. The center tongue 36 is bent in such a manner as to be vertically offset from the outer fingers 32a and 32b. The center tongue 36 has a free end. Further, a load protuberance 40 is formed on the surface of the center tongue 36, which is opposite to the surface on which the head slider 50 is secured. The protuberance 40 contacts the load beam offset 28 of the suspension element 10. The offset 28 presses the head slider 50 toward a disk 30.

Since the center tongue 36 is pivotable about the load protuberance 40 and supports the head slider 50, the slider 50 can pitch around the longitudinal axis of the suspension element 10 and roll about an axis orthogonal to the longitudinal axis about the load protuberance 40. Accordingly, the head slider 50 can excellently follow the surface irregularities (changing topography) of the rotating disk 30.

The arm section 60 is driven by the actuator assembly (not shown) rightward and leftward as viewed in FIG. 1. Thus, the head slider 50 is positioned at a target track on the surface of the disk 30.

Examples of the dimensions of the suspension element 10 and the flexure 22 will be explained hereinafter in more detail. In order to clarify the fanctions of each comporment, this mechanism is modified in scale in the drawings. The thickness $T_s$ of the suspension element 10 is 0.08 mm; the axial length $L_f$ of the mount section 15 is 6.0 mm; and the width $W_f$ of the mount section 15 is 6.8 mm. The length $L_r$ of the rectangular resilient section 20 is 2.16 mm; the length $L_t$ of the triangular section 18 is 21.0 mm; the width $W_t$ of the apex is 0.8 mm; and the length $L_o$ of the offset 28 is 0.7 mm. Further, the height $H_f$ of the flanges 19 of the triangular portion 18 is 0.66 mm. The thickness $T_g$ of the flexure 22 is 0.05 mm, and the axial length $L_g$ of the flexure 22 is 9.5 mm. In addition, the length $L_p$ of the flexure 22 from its distal end to the protuberance 40 is 2.5 mm.

Figure 2:
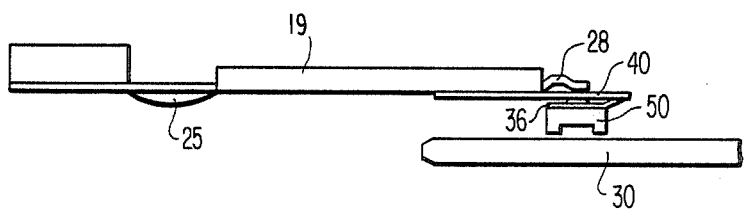
FIG. 2 is a side view of the magnetic head supporting mechanism shown in FIG. 1.
Figure 3:
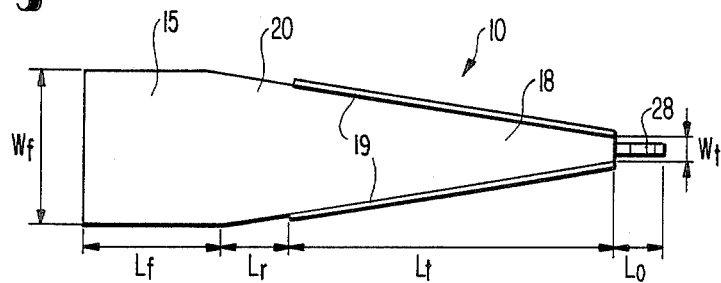
FIG. 3 is a plan view of a suspension element employed in the mechanism shown in FIG. 1.
Figure 4:
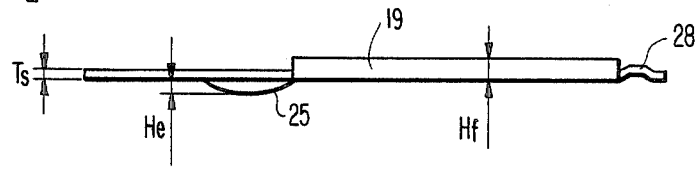
FIG. 4 is a side view of the suspension element shown in FIG. 3.
Figure 5:
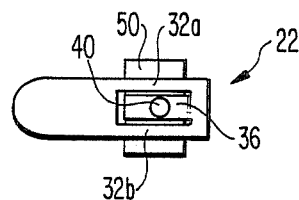
FIG. 5 is a plan view of a slide-flexure assembly employed in the mechanism shown in FIG. 1.
Figure 6:
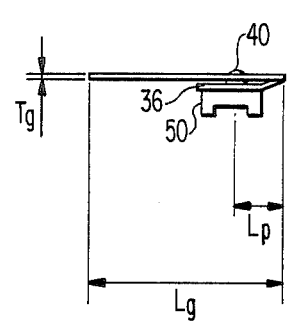
FIG. 6 is a side view of the slider-flexure assembly shown in FIG. 5.

Referring now to FIG. 7, the rectangular resilient section 20 of the suspension element 10 is arcuately bent by an angle $\theta$. Accordingly, the suspension element 10 takes the L-shape in a state wherein no load is applied to the suspension element 10. When the suspension element 10 is mounted on a magnetic disk apparatus, the rectangular resilient section 20 extends and is substantially parallel to the disk surface as shown in FIG. 2. Accordingly, the head slider 50 is pressed to the surface of the disk 30 with a pressing force corresponding to the angle $\theta$. In accordance with this embodiment, the angle $\theta$ is set about 19°, and the pressing force is about 15 gf.

According to the present invention, a flexible resin 25 is firmly attached to the rectangular resilent section 20 of the suspension element 10 on the lower surface facing to the disk surface. In this embodiment, a two-pack epoxy adhesive whose elongation after hardening is 60% is employed as the flexible resin 25. This adhesive is coated in a convex shape in a state wherein the rectangular resilient section 20 is straightened. The adhesive is coated such that the height $H_e$ of the top portion of the convex is about 0.3 mm and is then dried for firmly attaching to the surface of the rectangular resilient section 20. The resin 25 functions as a damper against vibrations. Accordingly, the resin 25 can reduce the vibration of the head slider 50 in the directions parallel to the disk surface which is caused by the minute irregularities of the lower surface of the rectangular resilent section 20.

The elongation of the flexible resin 25 is preferably selected in the limits between 50 and 70%. Accordingly, as the resin 25, a one-pack thermosetting adhesive or an ultraviolet-curing adhesive may be employed instead of a two-pack epoxy adhesive.

In this embodiment, although the resin 25 is coated in a state wherein the rectangular resilient section 20 is straightened, the resin 25 may be coated in a state wherein the rectangular resilient section 20 is bent. However, it is possible to reduce the residual stress after the resin 25 has dried and to prevent the separation of the resin 25 from the rectangular resilient section 20 by coating and drying the resin in the state wherein the rectangular resilient section 20 is straightened because the suspension element 10 is mounted on the disk apparatus with the rectangular resilient section 20 straightened.

Further, a flexible resin may be also coated to the opposite surface of the rectangular resilient section 20.

FIG. 8 shows characteristics of the vibration of the head slider 50 in the directions parallel to the surface of the disk 30 in the both case where the recutangular portion 20 is coated with the resin 25 and without the resin 25. In FIG. 8, the axis of ordinate represents the amplitude of vibrations, and the axis of abscissa represents the frequency of vibrations. The reference symbol A in FIG. 8 denotes the amplitude of the head slider 50 in the case where the resin 25 is not applied, while the symbol B represents the amplitude of the head slider 50 in the case where the recutangular resilient section 20 is coated with the resin 25. As will be clear from FIG. 8, the head slider 50 supported by the suspension element 10 which is not coated with the resin 25 vibrates with large amplitudes in sympathy with vibration frequencies ranging from 1.8 to 1.9 KHz caused by the rotation of the disk, etc. By applying the resin 25 to the suspension element 10, the main sympathetic vibrations of the head slider 50 within the above-described frequency range can be reduced to 1/5.

As described above, the present invention can reduce the undesirable vibrations of the slider by securing the flexible resin to the suspension element of the magnetic head supporting mechanism. As a result, the magnetic head supporting mechanism capable of positioning the magnetic head at a target track with high accuracy can be obtained, and consequently, the supporting mechanism contributes to an increase in the track density of the magnetic disk.

What is claimed is:

1. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against bending force;

a magnetic head slider assembly supported at the free end of said third section opposing the surface of said magnetic disk; and a flexible resin firmly attached to the surface of said second section of said suspension element, with the surface of said flexible resin except for a portion of said flexible resin attaching to said suspension element, being open to the air, said flexible resin being firmly attached to the surface of said second section facing said magnetic disk.

2. A magnetic head supporting mechanism for positioning a magnetic head at a target track on the surface of a magnetic disk, comprising;

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against bending forces, said suspension element being bent at said second section toward said magnetic disk;

a magnetic head slider assembly supported at the free end of said third section opposing the surface of said magnetic disk; and a flexible resin firmly attached to the surface of said second section of said suspension element, with the surface of said flexible resin except for a portion of said flexible resin attaching to said suspension element, being open to the air.

3. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section by which said suspension element is secured to said arm section, a second section integral with said first section, and a third section integral with said second section and provided with bent side edges forming integral flanges to respective sides of said third section;

a magnetic head slider assembly supported at the free end of said third section opposing the surface of said magnetic disk; and a flexible resin firmly attached to the surface of said second section of said suspension element, with the surface of said flexible resin except for a portion of said flexible resin attaching to said suspension element, being open to the air, said flexible resin being any one selected from the group consisting of a two-pack epoxy adhesive, a one-pack thermosetting adhesive and an ultraviolet-curing adhesive.

4. The magnetic head supporting mechanism as claimed in claim 3, wherein said flexible resin is a firmly attached coating on said resilient section.

5. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against bending forces;

a magnetic head slider assembly supported at the free end of said third section opposing the surface of said magnetic disk; and a flexible resin firmly attached to the surface of said second section of said suspension element, with the surface of said flexible resin except for a portion of said flexible resin attaching to said suspension element, being open to the air, and wherein the elongation of said flexible resin being 50 to 70%.

6. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against being forces;

a magnetic head slider assembly supported at the free end of said third section opposing the surface of said magnetic disk; and a flexible resin firmly attached to the surface of said second section of said suspension element, with the surface of said flexible resin except for a portion of said flexible resin attaching to said suspension element, being open to the air, said flexible resin being of convex shape, and the thickness of said convex flexible resin at its top portion being about 0.3 mm.

7. A magnetic head supporting mechanism for positioning a magnbetic head a a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against bending forces;

a magnetic head slider assembly supported at the free end of said third section opposing the surface of said magnetic disk, said magnetic head slider assembly being pivotally supported by flexure means; and a flexible resin firmly attached to the surface of said second section of said suspension element, with the surface of said flexible resin except for a portion of said flexible resin attaching to said suspension element, being open to the air.

8. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to second section;

means coupled to said third section for rendering said third section rigid against bending forces;

a magnetic head slider assembly supported at the free end of said third section opposing the surface of said magnetic disk; and a flexible resin firmly attached to the surface of said second section, said flexible resin being one selected from the group consisting of a two-pack epoxy adhesive, a one-pack thermosetting adhesive and an ultraviolet-curing adhesive.

9. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against bending forces;

a magnetic head slider assembly supported at the free end of said third section opposing the surface of said magnetic disk; and a flexible resin firmly attached to the surface of said second section, and the elongation of said flexible resin being 50 to 70%.

10. A magnetic head supporting mechanism for positioning a magnetic head at a target track on the surface of a magnetic disk, comprising:

an arm section for moving said magnetic head to radially access different data tracks of said magnetic disk;

a suspension element made of a single resilient plate including, in order, a first section fixed to said arm section, a second section contiguous to said first section, and a third section contiguous to said second section;

means coupled to said third section for rendering said third section rigid against bending forces;

a magnetic head slider assembly supported at the free end of said third section opposing the surface of said magnetic disk; and a flexible resin firmly attached to the surface of said second section, said flexible resin being of convex shape, and said convex shape flexible resin having a height of about 0.3 mm.

* * * * *